July 18, 1967 A. HOHMANN 3,331,483
MANUAL ALPHA-NUMERIC HAND OPERABLE CARD PUNCH
Filed July 1, 1965 6 Sheets-Sheet 1

INVENTOR.
ALBERT HOHMANN
BY James H. Conner
AGENT.

July 18, 1967  A. HOHMANN  3,331,483
MANUAL ALPHA-NUMERIC HAND OPERABLE CARD PUNCH
Filed July 1, 1965  6 Sheets-Sheet 2

INVENTOR.
ALBERT HOHMANN
BY James H. Conner
AGENT.

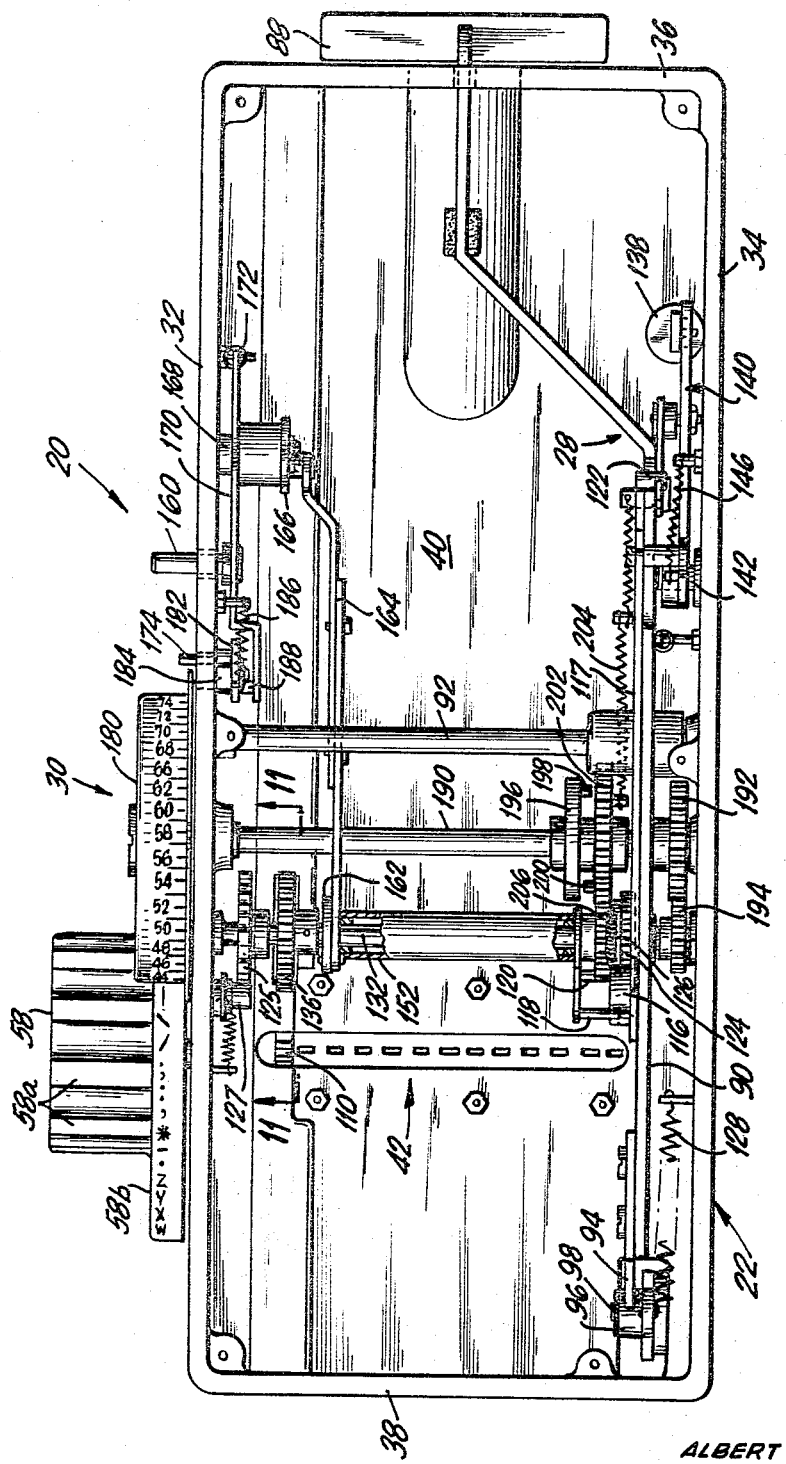

July 18, 1967

A. HOHMANN 3,331,483

MANUAL ALPHA-NUMERIC HAND OPERABLE CARD PUNCH

Filed July 1, 1965

INVENTOR.
ALBERT HOHMANN

BY James A. Conner

AGENT

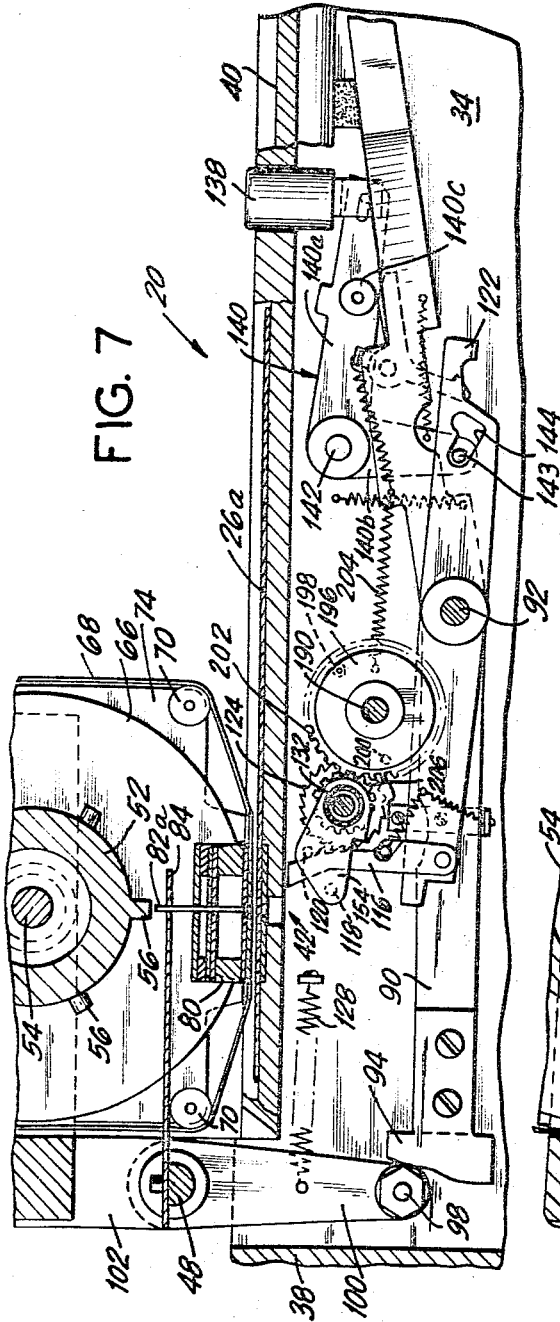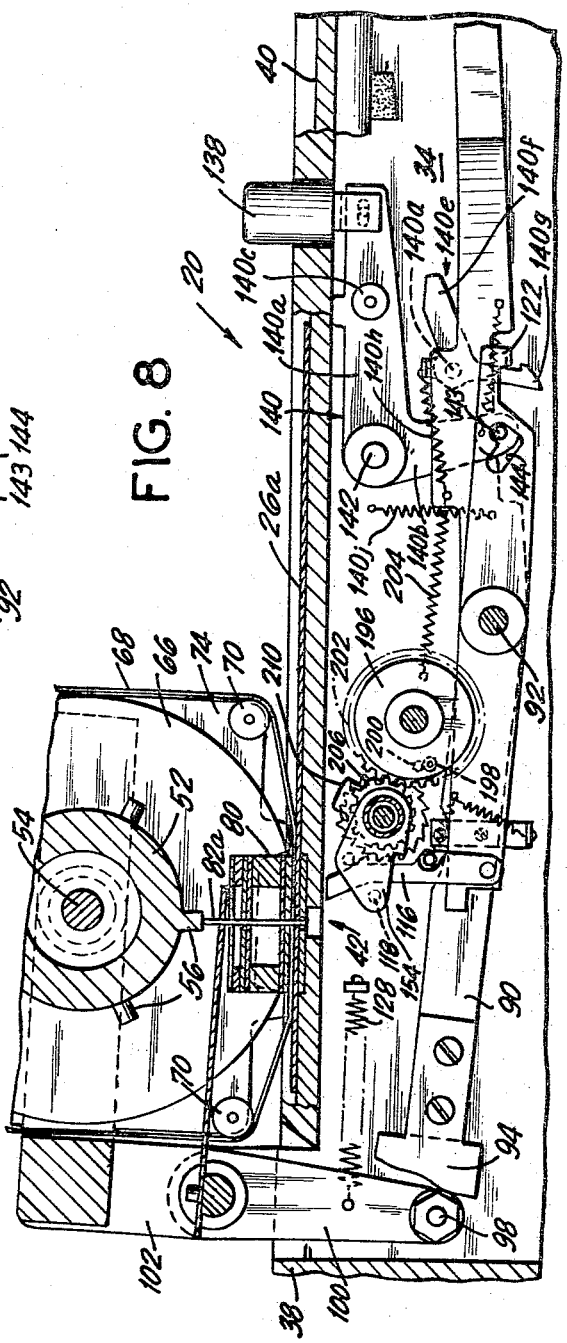

July 18, 1967  A. HOHMANN  3,331,483
MANUAL ALPHA-NUMERIC HAND OPERABLE CARD PUNCH
Filed July 1, 1965  6 Sheets-Sheet 6

INVENTOR.
ALBERT HOHMANN
BY James A. Conner
AGENT.

> United States Patent Office 3,331,483
Patented July 18, 1967

3,331,483
MANUAL ALPHA-NUMERIC HAND
OPERABLE CARD PUNCH
Albert Hohmann, Brooklyn, N.Y., assignor to Taller &
Cooper, Inc., Brooklyn, N.Y., a corporation of New
York
Filed July 1, 1965, Ser. No. 468,774
4 Claims. (Cl. 197—1.5)

This invention relates generally to card punching devices and more particularly to a novel manually actuated alpha-numeric card punch.

The preparation of tabulating cards heretofore has been generally accomplished by use of relatively complex and expensive keypunches which enter data in the form of discrete perforations in the tabulating cards. The perforations are necessarily accurately indexed relative to the card margins to permit multiple and repetitive use of cards in data processing equipment. The conventionally accepted keypunches readily maintain this required performation accuracy. However, the dimensions, cost, required electrical source, and complexity of the conventional keypunches restrict their use to data processing centers and prohibit their use as peripheral equipment. Peripheral equipment may be defined as means for punching limited quantities of tabulating cards at points remote from the central data processing equipment.

The present invention provides the equipment necessary to prepare such peripheral cards with the required accuracy, ease of operation and without an electrical source requirement. Briefly, the present invention provides a portable, manually operated, manually actuated device for perforating standard tabulating cards with alphabetical and numerical codal data.

Accordingly, one of the principal objects of the invention resides in the provision of a manually actuated card punch having manually selective alpha-numeric card punching means.

A further object of the invention resides in the provision of means to print indicia representative of the data being punched in the tabulating card.

Another object is to provide a card punch of the class described wherein the print indicia and code perforations are concurrently selected manually and simultaneously printed and punched with each punching operation.

Still another object of the invention is to provide a manual card punch having manually selective control of the information desired to be punched in a card and indicating means to indicate the particular information selected to be punched in the card.

Yet another object is to provide in a card punch of the class described automatic spacing means, manual spacing means, and columnar tabulating means for selectively entering data in particular columns in the tabulating card.

Other ancillary objects will be in part hereinafter pointed out and will be in part hereinafter apparent.

In the drawings:

FIGURE 4 is a bottom view of the card punch.

FIGURE 7 is a longitudinal cross section illustrating the spacing member in actuated position.

FIGURE 8 is a longitudinal cross section illustrating the spacing member in normal position and the manually actuatable punching member in manually actuated position.

Figure 1:
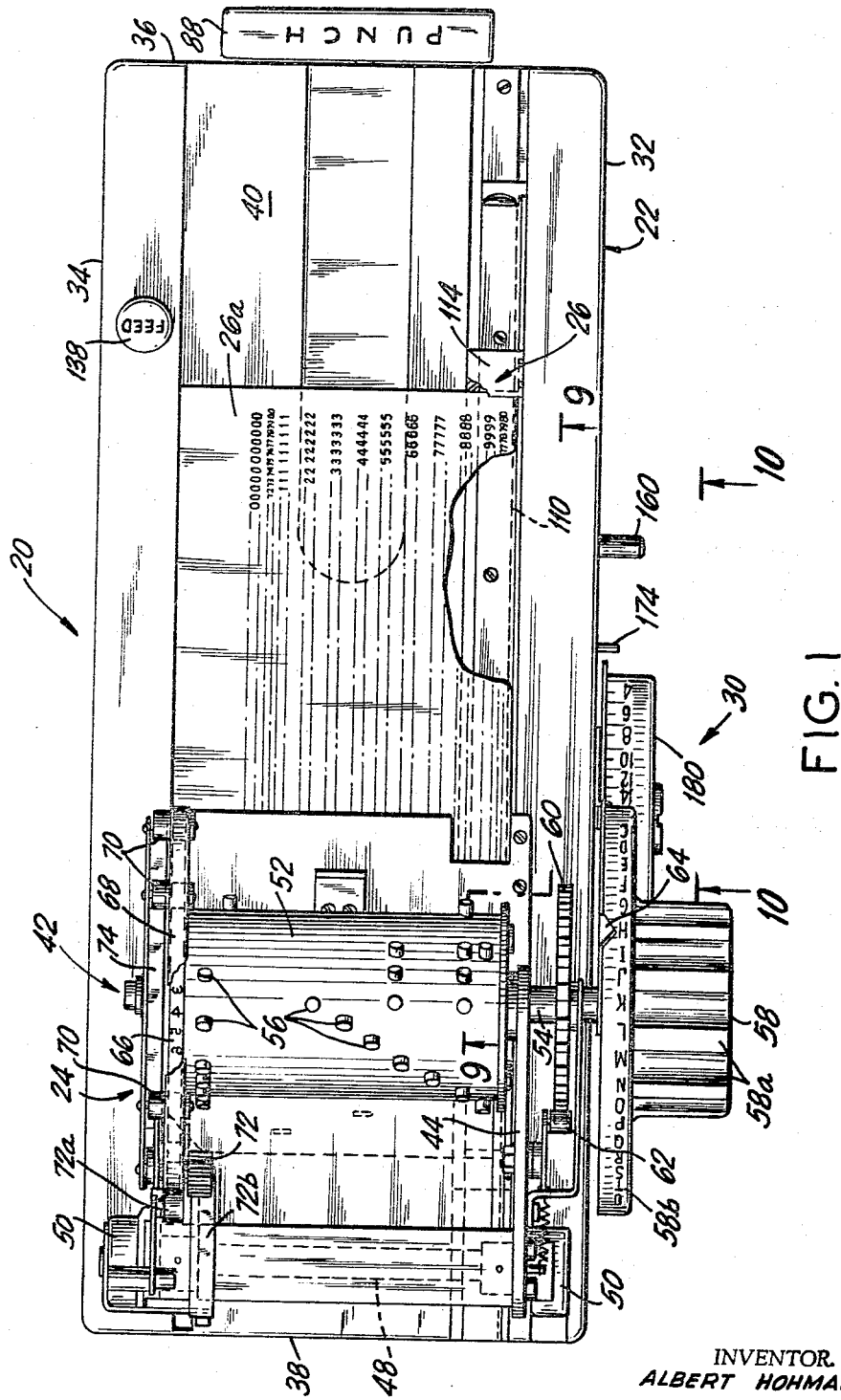
FIGURE 1 is a plan elevation of the manual card punch.
Figure 3:
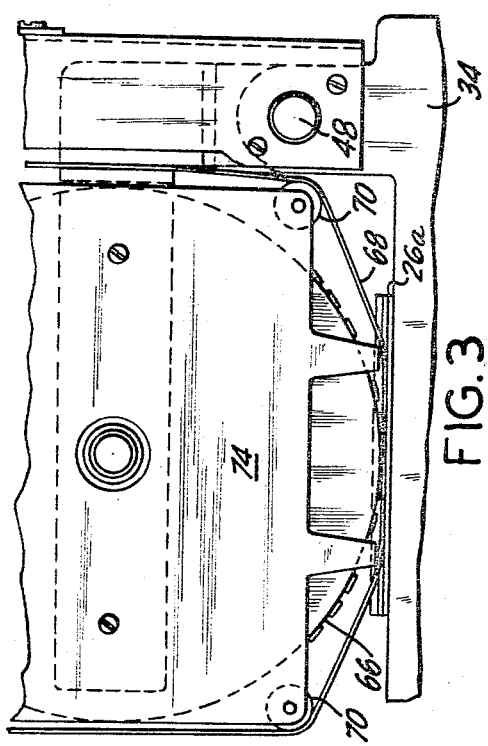
FIGURE 3 is an enlarged detail of the inked ribbon supply for transferring the embossed indicia onto the tabulating card.

Referring to the drawings in detail, 20 generally designates the manual card punch having a base section 22, a print and punch head 24, a card carriage 26, the print and punch head actuating means 28, and the card tabulating means 30.

Figure 2:
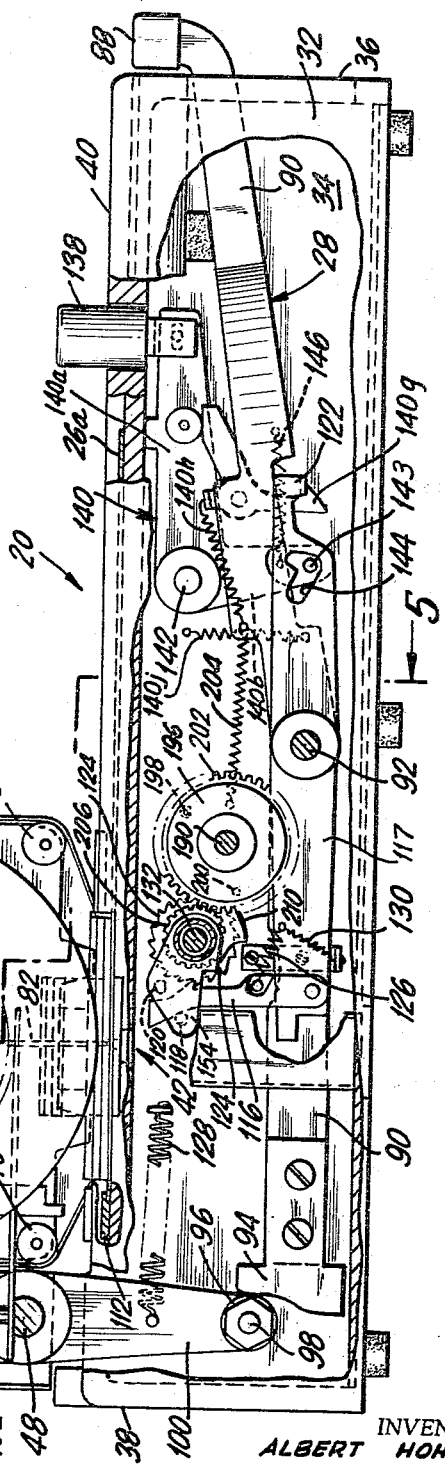
FIGURE 2 is a side elevation of the card punch with portions of the base casing cut away to more fully disclose the operating mechanisms.
Figure 5:
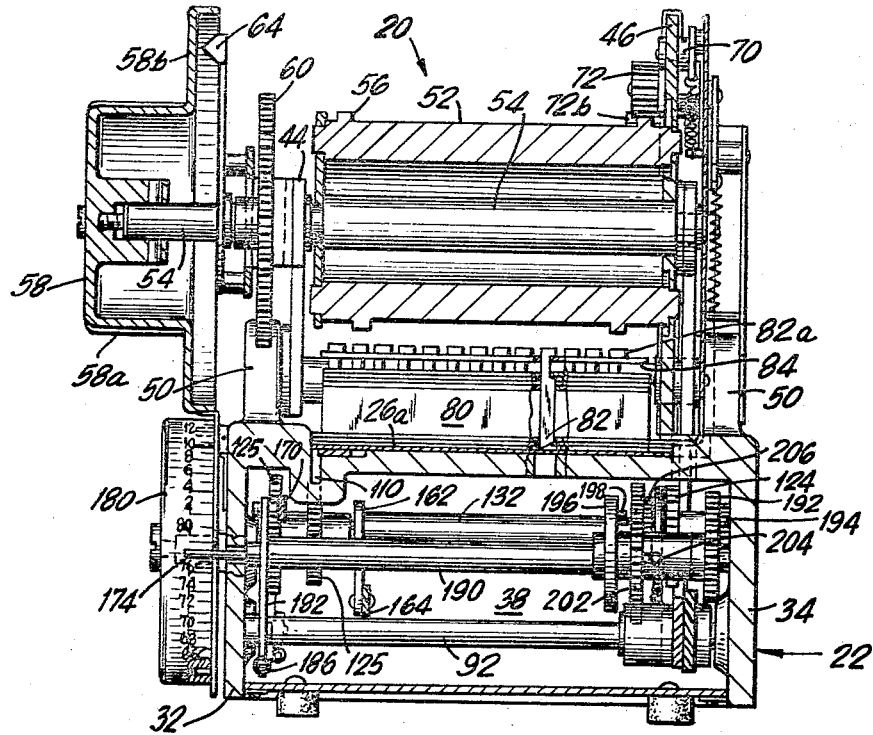
FIGURE 5 is a cross-sectional view taken along line 5—5 of FIGURE 2.
Figure 6:
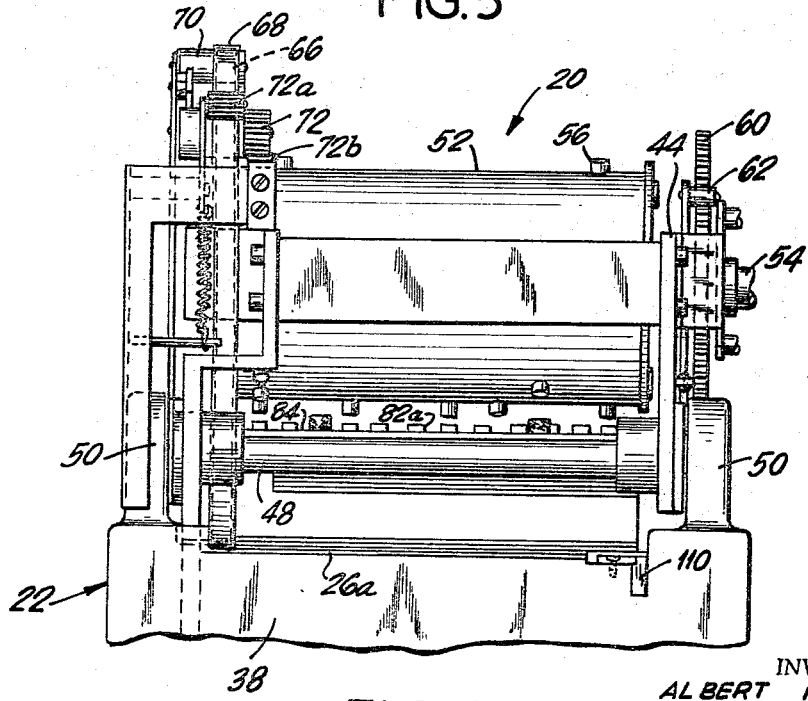
FIGURE 6 is a partial rear elevation of the manual card punch.

Base section 22, FIGURES 1, 2 and 4, is a substantially rectangular cast metal enclosure having side walls 32 and 34, end walls 36 and 38 and a planar top wall 40. Recessed in the top wall 40 is the card carriage 26 which effectively transports a conventional tab card 26a past the print and punch station 42, as will be hereinafter described, to selectively print and perforate desired columns in card 26a with predetermined data.

The print and punch head 24 is adapted to co-act with the card 26a to produce the desired perforate codal data and print data. Head 24 generally comprises a pair of side plates 44, 46, which are journaled on a shaft 48. Shaft 48 is secured in a pair of spaced raised bosses 50 integrally formed and projecting upwardly from top wall 40 of base casting 22. Disposed between side plates 44, 46, is a drum 52 affixed to shaft 54 journaled in suitable bearing in the respective side plates 44 and 46. The periphery of drum 52 is provided with discretely disposed projections 56 for a purpose hereinafter appearing. Shaft 54 projects beyond side plate 44 and the terminal portion has a knob 58 secured thereto. Also secured to shaft 54 and disposed intermediate the knob 58 and drum 52 is a detent wheel 60. Wheel 60 cooperates with a spring urged detent 62 to accurately index the shaft 54 relative to the print and punch station 42. It may be stated that the number of print and punch positions selectable by knob 58 are provided with a like number of detent positions in detent wheel 60.

It will be noted that knob 58 is provided with a manual gripping portion 58a and an indicia bearing portion 58b. A fixed pointer 64 visually indexes the indicia and therefore the respective selected position of the projections 56 on drum 52 that is in alignment with print and punch station 42.

In a similar manner, a printing wheel 66, affixed to drum 52, having engraved indicia peripherally disposed thereon, is concurrently rotatable with knob 58 to present the raised indicia at the print and punch station 42. Surrounding the print wheel 66 is an endless inked ribbon 68 that is adapted to be disposed between the raised indicia and card 26a at the print and punch station 42. Ribbon 68 is disposed upon a plurality of circumferentially spaced rollers 70 and a ratchet roller 72 journaled on a plate 74. Plate 74 is affixed to side plate 46 of print and punch head 24. A pressure roller 72a is adapted to press against the portion of ribbon 68 disposed on the periphery of ratchet roller 72, to rotate the ribbon with each printing operation, as will be hereinafter described.

Print and punch head 24 is adapted to pivot by means hereinafter described on shaft 48 to move print wheel 66 toward engagement with card 26a. A pawl 72b, affixed to a vertical bracket 74a, engages one tooth of ratchet roller 72. Each pivotal action downwardly of the print and punch head 24 moves the ratchet roller 72 away from pawl 72a a distance equal to one tooth. The restoring of head 24 upwardly to its initial position permits pawl 72b to re-engage the succeeding tooth of ratchet roller 72, thereby rotating roller 72 one increment. The pressure of roller 72a on ribbon 68 causes ribbon 68 to rotate with ratchet roller 72. Thus, the portion of endless ribbon 68 that was disposed under the indicia on the printing operation is advanced to present a fresh portion of the ribbon for the succeeding printing operation.

The punch portion of print and punch station 42 comprises a die assembly 80 having a plurality of punch pins 82 slidably disposed in aligned relation therein. Each pin 82 has an enlarged head 82a that overlies a stripper plate 84. Plate 84 is affixed to print and punch head 24 and moves therewith. Card 26a is adapted to be disposed under pins 82 and the downward pivotal movement of head 24 positions projections 56 in alignment with head portions 82a of punch pins 82. The continued downward movement of head 24 causes those pins 82 engaged by projections 56 to perforate card 26a. The return movement of head 24 causes plate 84 to withdraw pins 82 within die assembly 80 and leaves the card 26a unrestricted to advance to the next column.

Thus, it will be noted that each downward movement of print and punch head 24 perforates card 26a with the selected codal data and concurrently prints the equivalent indicia on the card in the same columnar relationship.

Means are provided to actuate the print and punch head 24 and directed toward this end is a depressable key 88 that projects from front wall 36 of base casting 22. Key 88 is affixed to a lever 90 which is pivotally mounted on a shaft 92. Secured to the other terminal of lever 90 is a cam member 94 which is engaged by a follower roller 96. Roller 96 is journaled on a stud 98 secured to arm 100 of bell crank 102. Arm 100a of bell crank 102 is secured to side plate 44 of head 24. Further, arm 100 is pivotally journaled on shaft 48. Thus, depression of key 88 pivots lever 90 on shaft 92 thereby raising cam member 94 which pivots bell crank 102 clockwise, FIGURES 2, 7, and 8, and lowers head 24 into printing and punching position. Spring means 128 restores head 24, bell crank 102, lever 90 and key 88 to their initial positions when manual pressure is released from key 88. The mechanical advantage gained through this linkage readily perforates and prints with nominal manual pressure on key 88.

Means are provided to feed the card carriage 26 one column or increment with each print and punch operation. Directed toward this end is a rack 110 which forms part of the carriage 26. A forward guide 112 and a rear guide 114 are adapted to receive the card 26a therein. As shown in FIGURE 1, the card 26a is the conventional 80 column Hollerith type card. Thus, rack 110 is provided with eighty increments, each increment corresponding to a single column in card 26a. Means cooperating with rack 110 positions card columns in accurate indexed relation with print and punch station 42.

Directed toward this end is a pawl 116 pivotally secured to lever 117 pivotally journaled on shaft 92 adjacent to lever 90. Pawl 116 is guided between pins 118 and 120 to permit vertical movement of the pawl 116 when lever 117 is rotated clockwise, FIGURE 2, around shaft 92. As hereinbefore set forth, depression of key 88 pivots lever 90 clockwise to raise cam 94 which actuates print and punch head 24 to print on and punch through card 26a. Lever 90, when depressed by key 88 engages a protrusion 122 affixed to lever 117. This engagement occurs immediately prior to the punch and print head 24 engaging card 26a. The continued rotation of lever 90 required to effect the physical printing and punching of card 26a rotates lever 117 clockwise and carries pawl 116 upwardly beyond the next tooth on ratchet 124. Spring means 126 urges pawl 116 into engagement with the succeeding tooth on ratchet 124. Spring 130 urges pawl 116 downwardly thereby rotating ratchet 124 one increment.

Ratchet 124 is affixed to shaft 132 which is journaled in base casting 22 side walls 32 and 34. Also affixed to shaft 132 is a pinion 136 which meshes with rack 110. Thus, one increment of rotation of ratchet 124 equals one increment of movement of rack 110 and therefore carriage 26. The one increment advances card 26a one columnar spacing and presents the succeeding column of card 26a to the print and punch line 42 in preparation for the next cycle of operation. A detent wheel 125, also affixed to shaft 132, cooperates with follower 127 to index the increment of advancement.

A spacing mechanism is provided to permit spacing or advancing of the card 26a to a desired column without printing or punching card 26a. A manually depressable key 138 extends through base section 22 and is affixed to arm 140a of bell crank 140 pivoted on a stud 142 secured to wall 34. Arm 140b of bell crank 140 has a pin 143 transversely projecting therefrom. Pin 143 resides in a modified V-shaped slot 144 formed in lever 117. The vertical portion of slot 144 receives pin 143 when lever 90 and lever 117 is rotated during a print and punch cycle without interfering with the rotation of said levers.

However, when spacing bell crank 140 is actuated, pin 143 enters the angular slot portion of V-slot 144 and cams lever 117 clockwise around shaft 92 thereby raising pawl 116 to rotate shaft 132 and advance carriage 26 one column card spacing. A spring 146 restores bell crank 140 and key 138 to their initial positions when manual pressure is removed from key 138. Key 138 may be defined as the means for single spacing carriage 26.

Arm 140a of bell crank 140 carries a follower 140c. Pivoted on arm 90, in any suitable manner, by means of pin 140d, is a latch 140e having an arm 140f in the path of the follower 140c. Latch 140e has a hook 140g lying in the path of protrusion 122 of lever 117. Latch 140e is urged to rotate in a counter-clockwise direction by a spring 140h. When key 138 is not depressed, the hook 140g normally engages beneath the protrusion 122 and spring 140h retains the hook in engagement with said protrusion 122, as shown in FIG. 2. When key 88 is depressed from the position of FIG. 2 to the position of FIG. 8, hook 140g first moves away from protrusion 122 and thereafter lever 117 is rotated by lever 90. When key 88 is released, lever 90 rotates in a counter-clockwise direction and hook 140g moves up against the underside of protrusion 122 and then rotates lever 117 in a counter-clockwise direction. A spring 140j serves to rotate lever 90 in a counter-clockwise direction upon releasing the key 88, permitting spring 128 to urge bell crank 102 to its initial position. However, when key 138 is depressed as shown in FIG. 7, follower 140c rotates the latch 140e in a clockwise direction moving hook 140g out of the path of protrusion 122. With the parts in the position of FIG. 7, key 88 may be depressed and then released for punching without rotating lever 117 and hence without advancing the carriage. In such case the lever 117 remains in a position shown in FIG. 7 wherein the pawl 116 is out of engagement with respect to the racket 124.

Figure 12:
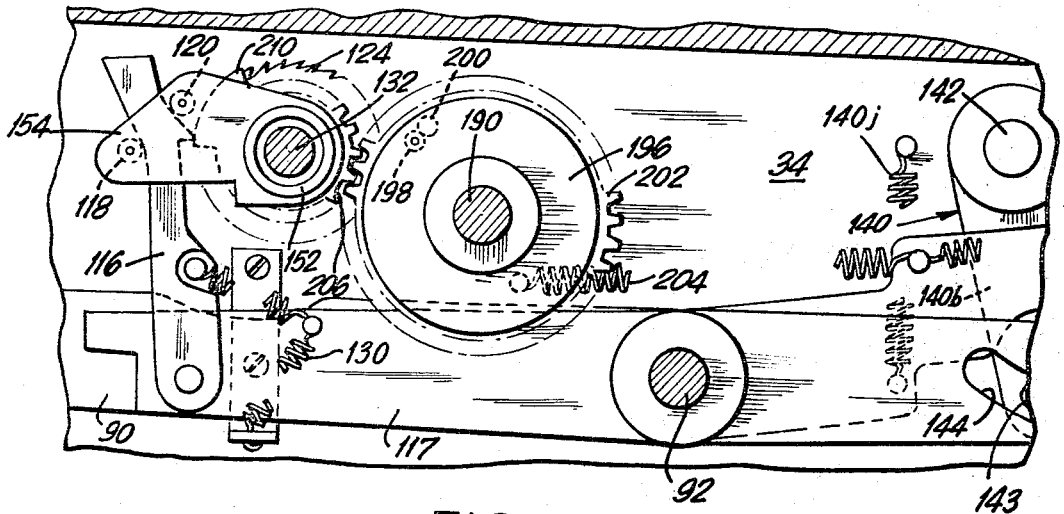
FIGURE 12 is a cross sectional view of the means for disabling the carriage stepping means when the last column of a card is presented to the print and punch station.

Means are also provided to permit tabulation movement of carriage 26, i.e.; rapid manual movement of the carriage from a print and punch position to any other desired print and punch position. Directed toward this end is a rack release mechanism 150 which, when actuated, releases pawl 116 from engagement with ratchet 124. Carriage 26 is free to move forwardly or rearwardly under manual control to any desired indicated column for printing and punching. Mechanism 150 comprises a sleeve 152 co-axially journaled on shaft 132 having an arm 154 secured thereon. Pins 118 and 120 are mounted on and transversely project from arm 154. Thus, a slight rotation of sleeve 152 rotates arm 154 which permits pins 118 and 120 to move pawl 116 counter clockwise, FIGURES 9, 10, and 12, to move said pawl out of engagement with ratchet 124 permitting ratchet 124 and shaft 132 to freely rotate under the manual influence of rack 110.

A release button 160 projects through a suitable slot in base side wall 32 and is actuatable to rotate sleeve 152. Sleeve 152 has affixed thereon an arm 162 which is pivotally secured to link 164. Link 164 is pivotally secured to arm 166 journaled on a stud 168 secured to sidewall 32. Also secured to arm 166 is a lever 170 and secured to lever 170 is release button 160 projecting through base side wall 32. Thus, depression of release button 160 rotates lever 170 counterclockwise, FIGURE 9, which rotates arm 166 counter-clockwise moving link 164 rightwardly and rotating arm 162 on sleeve 152 counter-clockwise. Arm 154 moves counter-clockwise, FIGURE 12, and pins 118, 120 move pawl 116 away from engagement with ratchet 124. A spring 172 restores release button 160 and its related mechanism to their initial positions when manual pressure is removed from release button 160.

Figure 9:
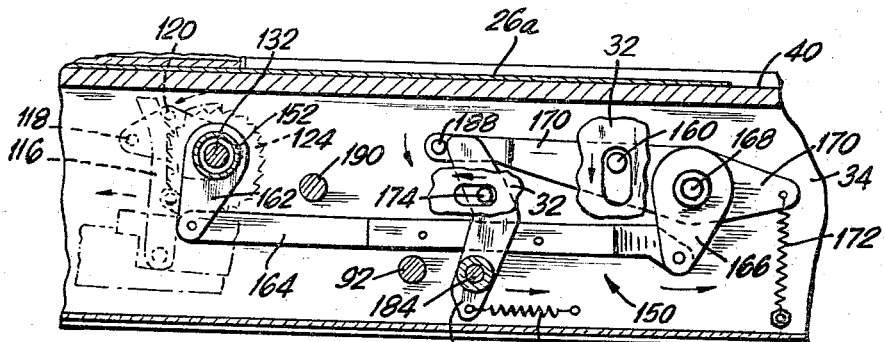
FIGURE 9 is a cross section taken along line 9—9 of FIGURE 1.
Figure 10:
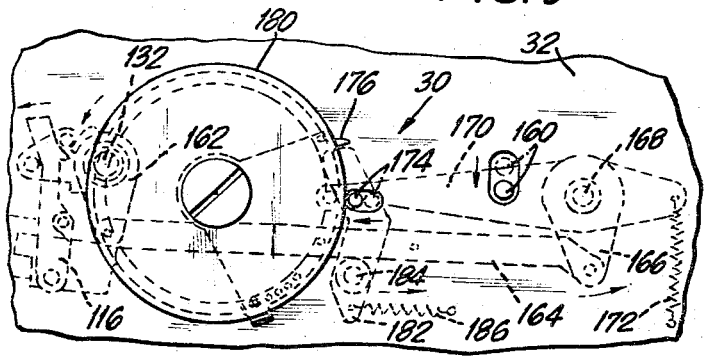
FIGURE 10 is a cross section taken along line 10—10 of FIGURE 1.
Figure 11:
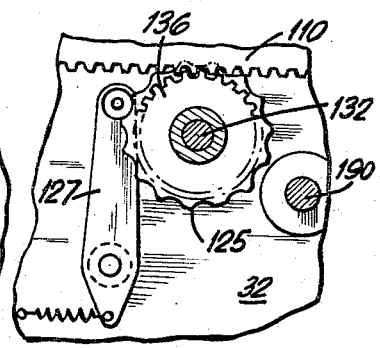
FIGURE 11 is a cross section taken along line 11—11 of FIGURE 4.

Concurrently with the actuation of release button 160 to free pawl 116 from ratchet 124, a margin stop mechanism is actuated to arrest the movement of carriage 26 in any pre-selected columnar position. Card tabulating mechanism 30 is directed toward this end to provide a moveable stop 174 which normally is disposed out of engagement with an adjustable finger 176 rotatable with columnar indicator wheel 180. Referring to FIGURE 9, a lever 182 pivotally mounted on a stud 184 affixed to the inner surface of wall 32 has transversely projecting therefrom stop 174 through an appropriate slot in wall 32. Spring 186 urges lever 182 counter-clockwise. A pin 188, projecting from lever 170, restricts counter-clockwise rotation of lever 182. When release button 160 is manually moved downwardly, lever 170 and pin 188 permit lever 182 to rotate counterclockwise thus moving stop 174 toward columnar indicator wheel 180. Adjustable stop 176, hereinafter described in detail, engages stop 174 and the carriage 26 is arrested at a predetermined column for print and punch operation. Columnar indicator wheel is affixed to a transverse shaft 190 which extends in suitable bearings between base side walls 32, 34 and projects through wall 32. Affixed to shaft 190 is a gear 192 that meshes with pinion 194 affixed to shaft 132. Thus, each increment of movement of rack 110 correspondingly moves indicator wheel 180 one increment to indicate the particular column of card 26a that will be printed and punched. Predetermination of the particular column that tabulating mechanism 30 will position card 26a is accomplished by the adjustable stop 176.

As shown in the drawings, stop 176 projects radially from the periphery of wheel 180. Stop 176 is pre-settable to align with any columnar indication on wheel 180. Wheel 180 has in the side periphery thereof plural recesses equal in number to the number of column indications. Cooperating with the recesses is a pin on the stop 176 which is spring urged into the selected recess. Stop 174 is normally disposed out of engagement with stop 176. Therefore, normal column by column spacing is not effected thereby.

When carriage 26 presents the last column in a card 26a to the print and punch station 42, means are actuated to disable the pawl 116 and disconnect said pawl from engagement with ratchet 124. This means is termed the 80th column card feed disabling means. Affixed to shaft 190 is a wheel 196 having a transverse pin 198 projecting therefrom. Pin 198 is adapted to engage a pin 200 transversely and oppositely extending from a gear 202 freely journaled on shaft 190. A spring 204 attached to gear 202 limits the rotation thereof. When pin 198 engages pin 200, gear 202 rotates with shaft 190. Gear 202 meshes with a pinion 206 that has affixed thereto a cam 210 which is adapted to engage pawl 116 at the 80th card position and disengage pawl 116 from ratchet 124. The resetting of card carriage 26 permits spring 204 to restore gear 202, pinion 206, and cam 210 to their ineffective positions.

Thus, there has been described and shown a manually actuated card punch that will perforate alphabetical and numerical codal representations and concurrently with each punching operation, print the representation in the column that is punched.

Further, there has been shown and described an automatic spacing mechanism for advancing the card carriage to the next column with each punching and printing operation. There has been provided a spacing mechanism for advancing the card carriage without printing or perforating the card.

Finally, there has been provided a card tabulating mechanism for rapidly feeding the card carriage to present a pre-selected column to the print and punch station.

Briefly, the present invention, while portable and completely manual in operation, readily provides all of the necessary features to prepare punched cards with accuracy that previously only was found in the conventional large, complex and expensive electric key punch machines.

While a single embodiment of the invention has been shown and described, it will be understood that modifications and changes could be made without departing from the scope of the invention as defined in the following claims.

The invention claimed is:

1. In combination, a base, a card carriage mounted thereon for longitudinally moving a tabulating card mounted thereon in the plane of said card, a row of punch means at a punch and print station on said base, disposed transversely of the carriage, means carrying a plurality of parallel rows of punch control means movable to selectively coordinate the rows of control means with said station, the control means of various rows of control means varying in arrangement from each other, printing means including a plurality of printing indicia movable together with said carrying means to selectively coordinate different printing indicia on said printing means with said station, means to mount said carrying means and said printing means for simultaneous movement toward said punch means to actuate punch means in the selected row of punch means to codally punch said card and print thereon, manually actuable means mounted on the base to step said carriage longitudinally in one direction for bringing successive transverse columnar portions of a card on said carriage into alignment with said station, and means mechanically controlled by actuation of said step means to move said carrying means and print means to simultaneously punch and print the card on said carriage at said station with each advancing step of said carriage, and means to cause step movement of said carriage without moving said carrying means and print means for a punch and print operation, whereby said card may be advanced step by step without punching and printing said card, said carrying means comprising a rotary member, said rows of punch control means being equiangularly spaced on said rotary member and said print means being mounted for rotary movement coaxially of said rotary member together therewith, and said rotary member and print means being movable together in a direction normal to the axis of said rotary member, said means to move said carrying means and print means comprising a lever pivoted to said base, means to mount said rotary member for rotation on said lever, a second lever pivoted to the base, a depressible key on said second lever and cam means on said second lever to rotate said first lever, when said key is depressed.

2. The combination of claim 1, said step means comprising a rack fixed to said carriage, a pinion meshing with said rack, and means controlled mechanically by depression of said key and consequent actuation of said second lever, to rotate said pinion one step for each depression of said key, said last means comprising a ratchet rotatable with said pinion and pawl means engageable with said ratchet.

3. The combination of claim 2, and manual means to disengage said pawl from said ratchet.

4. The combination of claim 2, a rotary indicator wheel, means controlled by movement of said ratchet to rotate said wheel, stop means selectively attachable to said wheel in various angular positions on said wheel, means normally disposed out of the path of said stop means, as said wheel rotates, and manually controlled means to move said normally disposed means into the path of said stop means, to stop rotation of said wheel when said stop means engages said normally disposed means.

References Cited
UNITED STATES PATENTS

| | | | |
|---|---|---|---|
| 422,728 | 3/1890 | Clark | 234—100 |
| 433,003 | 7/1890 | Hill | 234—100 |
| 682,197 | 9/1901 | Hollerith | 82—213 X |
| 734,576 | 7/1903 | Lagarde | 234—37 |
| 998,631 | 7/1911 | Peirce | 197—1.5 |
| 1,182,309 | 5/1916 | Peirce | 197—1.5 |
| 1,266,230 | 5/1918 | Dosch | 197—1.5 |
| 1,757,914 | 5/1930 | Long | 234—100 X |
| 2,013,540 | 9/1935 | Kolm et al. | 197—1.5 |
| 2,800,181 | 7/1957 | Taynton et al. | 234—100 |
| 2,993,642 | 7/1961 | Fender et al. | 234—37 |
| 3,063,622 | 11/1962 | Nold | 234—100 |
| 3,215,244 | 11/1965 | Hickerson | 197—1.5 |

ROBERT E. PULFREY, *Primary Examiner.*

E. S. BURR, *Assistant Examiner.*